United States Patent
Zhang et al.

(10) Patent No.: US 12,306,138 B2
(45) Date of Patent: May 20, 2025

(54) DIGITAL TWIN OF AN AUTOMATED NON-DESTRUCTIVE ULTRASONIC TESTING SYSTEM

(71) Applicant: Waygate Technologies USA, LP, Houston, TX (US)

(72) Inventors: Weiwei Zhang, Bonn (DE); Frank Kahmann, Aachen (DE)

(73) Assignee: Waygate Technologies USA, LP, Houston, TX (US)

( * ) Notice: Subject to any disclaimer, the term of this patent is extended or adjusted under 35 U.S.C. 154(b) by 605 days.

(21) Appl. No.: 17/295,674

(22) PCT Filed: Dec. 4, 2019

(86) PCT No.: PCT/US2019/064377
§ 371 (c)(1),
(2) Date: May 20, 2021

(87) PCT Pub. No.: WO2020/117889
PCT Pub. Date: Jun. 11, 2020

(65) Prior Publication Data
US 2022/0011269 A1    Jan. 13, 2022

Related U.S. Application Data

(60) Provisional application No. 62/775,278, filed on Dec. 4, 2018.

(51) Int. Cl.
*G01N 29/06* (2006.01)
*G01N 29/265* (2006.01)

(52) U.S. Cl.
CPC ..... *G01N 29/0618* (2013.01); *G01N 29/0609* (2013.01); *G01N 29/265* (2013.01); *G01N 2291/051* (2013.01); *G01N 2291/101* (2013.01)

(58) Field of Classification Search
CPC ............ G01N 29/0618; G01N 29/221; G01N 29/265; G01N 29/4418; G01N 2291/051;
(Continued)

(56) References Cited

U.S. PATENT DOCUMENTS 6,540,679 B2 * 4/2003 Slayton .................. A61B 8/463
600/440
8,371,171 B2 * 2/2013 Isobe .................... G01N 29/265
73/602

(Continued)

FOREIGN PATENT DOCUMENTS

EP            2618142 A2    7/2013

*Primary Examiner* — Judy Nguyen
*Assistant Examiner* — James Split
(74) *Attorney, Agent, or Firm* — Mintz, Levin, Cohn, Ferris, Glovsky and Popeo, P.C.

(57) ABSTRACT

Systems and methods are provided for generating a digital twin representation of an ultrasonic testing environment. In one aspect, probe position data received from one or more controllers and coordinate system data generated by one or more sensors can be used to generate a digital twin representation of an ultrasonic testing environment. In another aspect, generating the digital twin representation can include determining probe position measurements and a plurality of probe paths to be included in the digital twin representation. In one aspect the system can include a vision system to enable remote operation of the ultrasonic testing environment based on the generated digital twin representation.

21 Claims, 9 Drawing Sheets

(58) Field of Classification Search
CPC ......... G01N 2291/101; G01N 29/0609; G01N 29/04; G01N 29/24; G01N 29/44
See application file for complete search history.

(56) References Cited

U.S. PATENT DOCUMENTS

| | | | |
|---|---|---|---|
| 8,892,252 B1 * | 11/2014 | Troy | ............. G01B 11/14 700/258 |
| 9,804,577 B1 * | 10/2017 | Troy | ............. G01N 29/4472 |
| 9,869,538 B2 * | 1/2018 | Dolgikh | ............. G01B 5/008 |
| 2004/0117133 A1 | 6/2004 | Burkhardt et al. | |
| 2014/0047934 A1 | 2/2014 | Dominguez et al. | |
| 2016/0109409 A1 | 4/2016 | Bentouhami | |
| 2016/0203732 A1 | 7/2016 | Wallace et al. | |
| 2018/0308247 A1 * | 10/2018 | Gupta | ............. G06T 7/62 |

\* cited by examiner

DIGITAL TWIN OF AN AUTOMATED NON-DESTRUCTIVE ULTRASONIC TESTING SYSTEM

BACKGROUND

In some instances, non-destructive testing (NDT) is a class of analytical techniques that can be used to inspect characteristics of a component or a test piece, without causing damage, to ensure that the inspected characteristics satisfy required specifications. For this reason, NDT can be used in a number of industries such as aerospace, automotive, power generation, oil and gas transport or refining where component failures would be catastrophic.

Ultrasonic testing is one type of NDT. Ultrasound is acoustic (sound) energy in the form of waves that have an intensity (strength) which varies in time at a frequency above the human hearing range. In ultrasonic testing, an ultrasonic probe can generate one or more ultrasonic waves and these waves can be directed towards a target in an initial pulse. As the ultrasonic waves contact and penetrate the target, they can reflect from features such as outer surfaces and interior defects (e.g., cracks, porosity, etc.). The ultrasonic probe can also acquire ultrasonic measurements, acoustic strength as a function of time for example, that characterize these reflected ultrasonic waves and the inspected material. Subsequently, ultrasonic measurements can be analyzed to determine characteristics of the components or test pieces.

A digital twin is a digital replica of a physical asset, environment, and/or a system. Digital twins can be used to project physical objects or configurations of physical objects into a digital environment.

SUMMARY

In one aspect, a system is provided to ultrasonically test a test piece within an ultrasonic testing environment using a digital twin representation. The system can include a probe assembly coupled to one or more probe assembly controllers. The one or more probe assembly controllers can be configured to control the probe assembly. The probe assembly can include an ultrasonic probe coupled to one or more probe controllers. The one or more probe controllers can be configured to control the ultrasonic probe. The ultrasonic probe can be configured to transmit ultrasonic signals and to receive reflected ultrasonic signals. The system can include a plurality of sensors which can be configured to generate coordinate system data associated with an ultrasonic testing environment. The coordinate system data can correspond to one or more geometric features of the ultrasonic testing environment and a test piece within the ultrasonic testing environment. The system can also include a processor which can be configured with executable instructions. When executed, the executable instructions can cause the processor to receive probe position data. The probe position data can be generated by the one or more probe assembly controllers and the one or more probe controllers. The instructions can further cause the processor to receive coordinate system data associated with the ultrasonic testing environment. The instructions can also cause the processor to generate a digital twin representation of the ultrasonic testing environment. The digital twin representation can correspond to the coordinate system data and the probe position data. The generated digital twin representation can be a three-dimensional digital model of the ultrasonic testing environment. The instructions to generate the digital twin representation can also cause the processor to determine a plurality of probe position measurements. The plurality of paths can be included in the digital twin representation. The plurality of paths can include one or more paths along which the probe assembly and/or the ultrasonic probe can be configured to traverse within the ultrasonic testing environment. The instructions can further cause the processor to provide the digital twin representation.

In another aspect, a method is provided. The method can include receiving, by a processor of a computing device, probe position data. The probe position data can be generated by one or more probe assembly controllers coupled to the computing device and by one or more probe controllers. The one or more probe controllers can be coupled to the computing device and to an ultrasonic probe included in a probe assembly. The one or more probe assembly controllers can be configured to control the probe assembly. The one or more probe controllers can be configured to control the ultrasonic probe. The ultrasonic probe can be configured to transmit ultrasonic signals and to receive reflected ultrasonic signals. The method can also include receiving, by the processor of the computing device, coordinate system data associated with an ultrasonic testing environment. The coordinate system data can correspond to one or more geometric features of the ultrasonic testing environment and a test piece within the ultrasonic testing environment. The coordinate system data can be generated by a plurality of sensors coupled to the computing device. The method can further include generating, by the processor of the computing device, a digital twin representation of the ultrasonic testing environment. The generated digital twin of the ultrasonic testing environment can correspond to the coordinate system data and to the probe position data. The generated digital twin representation can be a three-dimensional digital model of the ultrasonic testing environment. The method step of generating the digital twin representation can include determining a plurality of probe position measurements and a plurality of paths to be included in the digital twin representation. The plurality of paths can include one or more paths along which the probe assembly and/or the ultrasonic probe can be configured to traverse within the ultrasonic testing environment. The method can also include providing, by the processor of the computing device, the digital twin representation.

In another aspect, a device is provided. The device can include a display and one or more controllers coupled to a probe assembly including an ultrasonic probe. The one or more probe controllers can be configured to control the ultrasonic probe. The ultrasonic probe can be configured to transmit ultrasonic signals and to receive reflected ultrasonic signals. The device can also include one or more probe assembly controllers configured to control the probe assembly. The device can include a processor coupled to the display and to the controller. The device can also include a memory coupled to the processor. The memory can store computer-readable executable instructions, which when executed cause the processor to perform operations. The operations can include receiving probe position data. The probe position data can be generated by the one or more probe assembly controllers and by the one or more probe controllers. The operations can also include receiving coordinate system data associated with an ultrasonic testing environment. The coordinate system data can correspond to one or more geometric features of the ultrasonic testing environment and a test piece within the ultrasonic testing environment. The coordinate system data can be generated by a plurality of sensors coupled to the computing device.

The operations can further include generating a digital twin representation of the ultrasonic testing environment corresponding to the coordinate system data and the probe position data. The generated digital twin representation can be a three-dimensional digital model of the ultrasonic testing environment. The operation of generating the digital twin representation can include determining a plurality of probe position measurements and a plurality of paths to be included in the digital twin representation. The plurality of paths can include one or more paths along which the probe assembly and/or the ultrasonic probe can be configured to traverse within the ultrasonic testing environment. The operations can also include providing the digital representation via the display.

BRIEF DESCRIPTION OF THE DRAWINGS

These and other features will be more readily understood from the following detailed description taken in conjunction with the accompanying drawings, in which.

Figure 1:
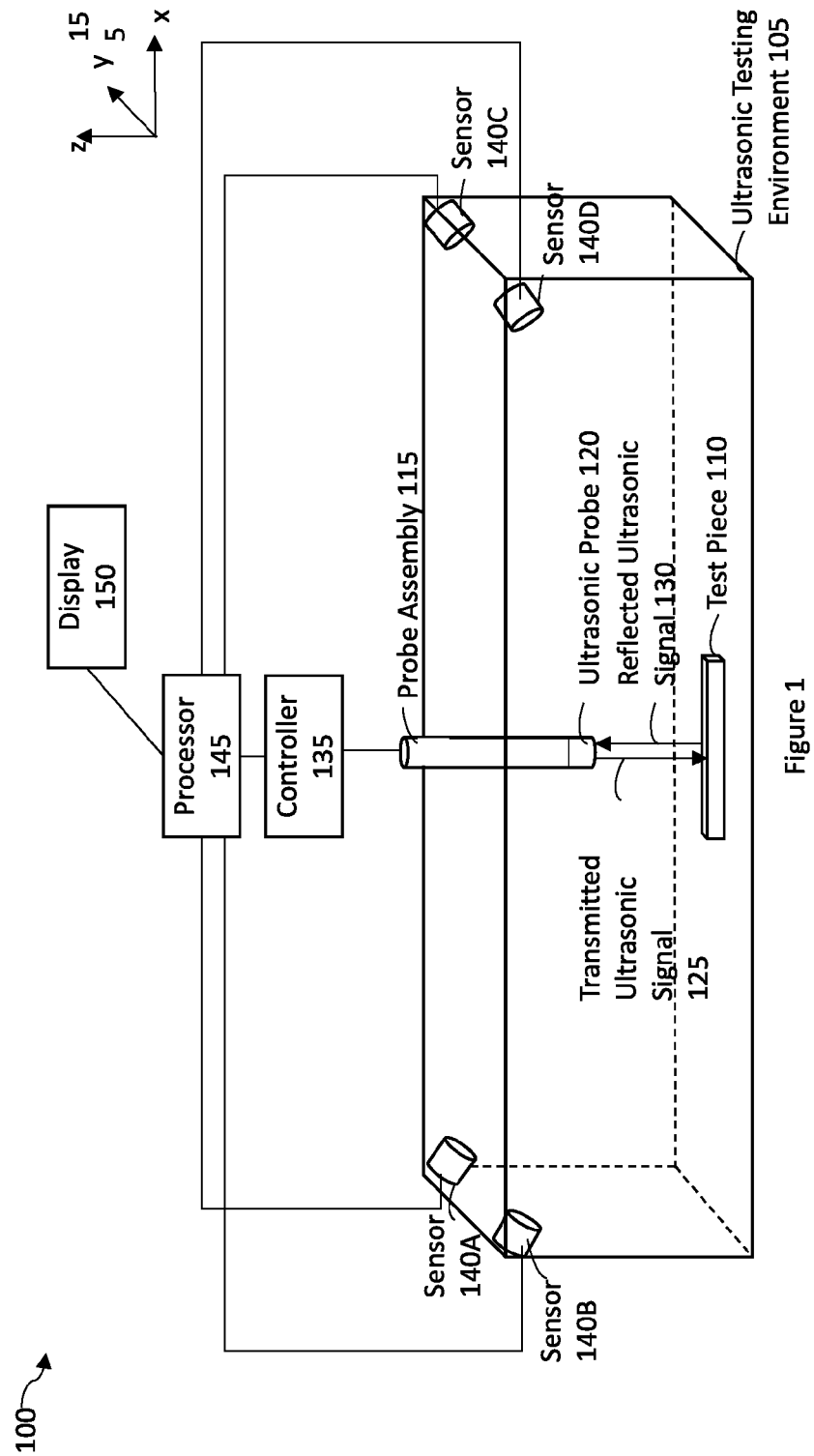
FIG. 1 is a diagram illustrating an exemplary embodiment of a system configured to generate a digital twin representation for use in ultrasonic testing.

It is noted that the drawings are not necessarily to scale. The drawings are intended to depict only typical aspects of the subject matter disclosed herein, and therefore should not be considered as limiting the scope of the disclosure. Those skilled in the art will understand that the systems, devices, and methods specifically described herein and illustrated in the accompanying drawings are non-limiting exemplary embodiments and that the scope of the present invention is defined solely by the claims.

DETAILED DESCRIPTION

Ultrasonic testing can be performed in an ultrasonic testing environment using ultrasonic probes. The ultrasonic probes can be used for non-destructive testing of test pieces within the testing environment and can include ultrasonic transducers that are configured to transmit and/or receive ultrasonic waves. The strength of ultrasonic waves reflected from the test piece features (e.g., geometric boundaries, material flaws, etc.), as well as the amount of time that elapses between transmitting an ultrasonic wave and receiving the reflected ultrasonic wave, can vary depending on the test piece material, the location of the test piece features with respect to the ultrasonic transducer, and/or the shape of the test piece feature. Ultrasonic testing can be performed in a laboratory setting using an ultrasound tank to precisely capture the ultrasonic measurements of test pieces in a controlled environment.

Ultrasonic testing of components or test pieces can be performed in an ultrasound testing tank filled with water. In the ultrasound testing tank, an ultrasound probe can be positioned with specific alignment in terms of for example distance and angles with respect to the test piece. The ultrasound probe can be configured to emit ultrasound signals and receive signals which are reflected back to the ultrasound probe from the test piece. The reflected signals can be recorded as ultrasonic measurements which are associated with characteristics of the test piece.

Software can be used to control the positioning and alignment of the ultrasound probe in relation to the test piece. Such systems require an experienced user who must slowly position and align the probe in an accurate manner in order to avoid a collision with the test piece. The experienced user must slowly advance the ultrasound probe into the desired location necessary to accurately conduct the ultrasonic testing of the test piece which can extend the duration of the ultrasonic testing. In addition, such systems can provide limited feedback to the user regarding the location of the ultrasound probe relative to the test piece. The user can be limited to viewing only the reflected ultrasound signal in order to accurately position the probe. In addition, grease or oil which may be present in or on the test piece can contaminate the water in the ultrasound testing tank. The contaminated water can become opaque and further diminishes the ability to see probe and test piece. In this way, it can be difficult for a user to visually position the ultrasound probe in relation to the test piece.

Aligning the ultrasonic probe with respect to the test piece to perform testing in the ultrasonic testing environment can be a manual, time-consuming process, especially for inexperienced users. Yet, properly positioning the ultrasonic probe in relation to the test piece can be critical to ensure that the ultrasonic testing produces accurate measurements of the test piece. To improve aligning the ultrasonic probe with the test piece, a three-dimensional model, such as a digital twin of the ultrasonic testing environment can be used to provide coordinate system data defining the geometric dimensions and features of the ultrasonic testing environment and a test piece therein. Digital twins can provide a three-dimensional model or digital representation of a component, such as a valve in an aircraft engine, as well as the dynamics that may be associated with the component in a particular environment, for example the motions of the valve as it interacts with a cylinder head inside the aircraft engine. Digital twins can be used to provide a consistent digital representation of a particular physical environment in which test components are to be ultrasonically evaluated. Accordingly, systems and methods for generating a three-dimensional, digital twin representation of the ultrasonic testing environment are provided. The digital twin representation can provide a three-dimensional model of the ultrasonic testing environment that can be used to more accurately visualize and determine the positioning of the ultrasonic probe in relation to the test piece, as well as particular paths that the ultrasonic probe can travel to perform the ultrasonic testing.

In general, systems and methods are provided for generating a digital twin representation of an ultrasonic testing environment. The generated digital twin representation can enable more precise positioning of probe assemblies and/or ultrasonic probes when performing ultrasonic testing in the ultrasonic test environment. Alignment of the probe assemblies and/or ultrasonic probes can be slow and require an experience user to perform the ultrasonic testing using conventional systems and methods. In contrast, the generated digital twin representation can provide users with a more accurate representation of the geometric features of the ultrasonic testing environment than can be acquired otherwise using the conventional systems or methods. In this way, a probe assembly and/or an ultrasonic probe can be positioned relative to a test piece with a greater degree of precision in order to avoid damaging the probe assembly, ultrasonic probe, and/or test piece due to collisions that may occur when these elements are positioned relative to one another without the aid of a digital twin representation. In addition, the generated digital twin representation can reduce the amount of time to perform ultrasonic testing as a result of providing users with a more accurate depiction of the geometric features and dimensions of the ultrasonic testing environment. The generated digital twin representation can also be used to automate ultrasonic testing by providing specific paths for the probe assembly or ultrasonic probe to traverse within the ultrasonic testing environment. For example, the generated digital twin representation can be used to perform an ultrasonic testing scan of a test piece at a constant distance and/or constant angle of the ultrasound probe relative to the test piece. The generated digital twin representation can also be used to determine the position of the probe assembly and/or ultrasonic probe necessary to perform ultrasonic testing along one or more of the paths to be traversed during the ultrasonic testing.

Embodiments of systems and corresponding methods for generating a digital twin representation of an ultrasonic testing environment are disclosed herein. However, embodiments of the disclosure can be employed for generating a digital twin representation of other testing environments without limit.

FIG. 1 illustrates one exemplary embodiment of a system 100 configured to generate a digital twin representation for use in ultrasonic testing. The system 100 includes a probe assembly 115. The probe assembly 115 includes an ultrasonic probe 120 configured to emit a transmitted ultrasonic signal 125 toward the test piece 110 and to receive a reflected ultrasonic signal 130 from the test piece 110. The system 100 also includes a controller 135 configured to position the probe assembly 115 and/or the ultrasonic probe 120 within the ultrasonic testing environment 105 in relation to the test piece 110. In some embodiments, the system 100 includes a plurality of controllers. For example, a first plurality of controllers 135 can be configured to position the probe assembly 115, while a second plurality of controllers 135 can be configured to position the ultrasonic probe 120. The controller 135 is coupled to the processor 145 such that probe position data corresponding to the location of the probe assembly 115 and/or the ultrasonic probe 120 is transmitted to the processor 145 for use in generating the digital twin representation of the ultrasonic testing environment 105. The system 100 also includes one or more sensors 140 (e.g., sensors 140A-140D). The sensors 140 are configured to determine the dimensions and geometric features of the ultrasonic testing environment 105, as well as the test piece 110 positioned therein, and to generate coordinate system data associated with the ultrasonic testing environment 105. The coordinate system data can represent a three-dimensional model of the ultrasonic testing environment 105. The sensors 140 are coupled to processor 145, which can be configured with executable instructions that when executed cause the sensors to generate and transmit the coordinate system data to the processor 145. The processor 145 can generate a digital twin representation of the ultrasonic testing environment 105 based on the probe position data and the received coordinate system data. The processor 145 is also coupled to a display 150, which provides a graphical user interface displaying a graphical user interface associated with the digital twin representation.

To facilitate the discussion of the system 100, and various embodiments of the system and components described herein, a coordinate system reference 155 is provided in the upper right corner of FIG. 1 and is also provided in subsequent figures. The coordinate system reference 155 is shown with an x-axis, y-axis, and z-axis such that each axis is orthogonal to the other two axes.

As shown in FIG. 1, an ultrasonic testing environment 105 defines a three-dimensional volume in which ultrasonic testing may be performed. In some embodiments, the ultrasonic testing environment 105 can be configured as, but not limited to, a rectangular tank in which a test piece 110 can be placed for ultrasonic testing. The ultrasonic testing environment 105 can be configured in a variety of arrangements which form a three-dimensional volume suitable for ultrasonic testing. In some embodiments, the ultrasonic testing environment 105 can include a fluidic medium, such as water (not shown), to convey the ultrasonic signals to and from the ultrasonic probe. The specific dimensions and geometric features of the ultrasonic testing environment 105 will be determined by the sensors 140 and incorporated into coordinate system data included in the generated digital twin representation.

As further shown in FIG. 1, a test piece 110 is positioned within the ultrasonic testing environment 105. The test piece 110 is the objective target of the ultrasonic testing performed within the ultrasonic testing environment 105. The test piece 110 can be any object for which ultrasonic test data is to be acquired. For example, the test piece 110 can be an internal component of an aircraft engine that is being evaluated for material defects present within the component. The test piece 110 can be located at any location within the ultrasonic testing environment 105 suitable for accurately performing ultrasonic testing. The test piece 110 can be located with respect to specific pre-determined reference locations within the ultrasonic testing environment 105. For example, the test piece 110 can be located atop a block positioned on the floor of the ultrasonic testing environment 105 in order to bring the test piece 110 within range of the ultrasonic probe 120. The specific location, orientation, dimensions, and geometric features of the test piece 110 will be acquired by the sensors 140 and incorporated into the coordinate system data for use in generating the digital twin representation of the ultrasonic testing environment 105.

As shown in FIG. 1, the system 100 includes a probe assembly 115 and an ultrasonic probe 120 coupled to the probe assembly 115. The probe assembly 115 can include a plurality of motors or positioning devices (not shown) which are configured to adjust the position of the probe assembly 115 and the ultrasonic probe 120 in three or more degrees of freedom relative to the test piece 110 within the ultrasonic testing environment 105. The motors or positioning devices can be coupled to the controller 135 and can receive inputs from the controller 135 to adjust the position of the probe assembly 115 (and the ultrasonic probe 120). For example, the motors or positioning devices can be configured to position the probe assembly 115 and/or the ultrasonic probe 120 in regard to any of the x, y, or z-axes shown in coordinate system reference 155. In some embodiments, the motors or positioning devices can be configured to position the probe assembly 115 and/or the ultrasonic probe 120 in regard to one or more combinations of the x, y, or z-axes. Additionally, the plurality of motors or positioning devices can also be configured rotate the probe assembly 115 and the ultrasonic probe 120 about the x, y, and z-axes thereby adjusting the yaw, pitch, and roll of the probe assembly 115 and the ultrasonic probe 120 to achieve six degrees of freedom. In this way, the probe assembly 115 (and/or the ultrasound probe 120) can be positioned in a variety of locations within the ultrasound testing environment 105. Once positioned relative to the test piece 110, the ultrasound probe 120 is configured to emit a transmitted ultrasonic signal 125 in the direction of the test piece 110 and to receive a reflected ultrasonic signal 130.

As further shown in FIG. 1, the probe assembly 115 is coupled to controller 135. The controller 135 can include executable instructions, which when executed, adjust the location of the probe assembly 115 and/or the ultrasonic probe 120 via the one or more motors or positioning devices described above.

As shown in FIG. 1, the system 100 includes a plurality of sensors 140, for example, sensors 140A-140D. The sensors 140 are coupled to the processor 145 and can be configured to detect the specific dimensions and geometric features of the ultrasonic testing environment 105, the ultrasonic probe 120, as well as the test piece 110. The detected dimensions and geometric features can then be received by the processor 145 as coordinate system data and used to generate a digital twin representation of the ultrasonic testing environment 105. As shown in FIG. 1, each of the sensors 140 are located in a corner of the ultrasonic testing environment 105 and elevated to be positioned near the top of the rectangular tank. The location of the sensors 140 can vary based on the type of sensor 140, the configuration of the ultrasonic testing environment 105, the size and/or shape of the test piece 110, as well as the configuration of the probe assembly 115. For example, the sensors 140 can be located on the sides or bottom of the ultrasonic testing environment 105. In some embodiments, the sensors 140 can be located outside of the ultrasonic testing environment 105. Exemplary sensors 140 include tactile and non-tactile sensors. Non-tactile sensors 140 can include ultrasonic sensors, optical sensors utilizing visible wavelengths, and sensors utilizing non-visible wavelengths such as infrared sensors. Tactile sensors 140 can include sensors configured to detect dimensions or geometric features of the ultrasonic testing environment 105 (and the test piece 110) via touch, such as the contact pressure or force measured between the sensor surface and a surface of the ultrasonic testing environment 105 (and/or the test piece 110). Tactile sensors 140 can include, for example, capacitive tactile sensors, piezo-resistive tactile sensors, piezoelectric tactile sensors, and/or optical tactile sensors.

The digital twin can include potential movements of the ultrasonic probe 120 and/or the test piece 110. The ultrasonic probe 120 can be moved to the extremities of the ultrasonic testing environment 105 to embrace potential movements into the digital twin. The test piece 110 optionally, can also be moved, such as by a turntable, shifting table, or a tailstock. In many ultrasonic testing applications the ultrasonic probe 120 can describe a scan path, for example an irregular or meandering path for flat products. In some embodiments, the ultrasonic probe 120 can be configured to perform a linear scan path. Additionally, or alternatively, the ultrasonic probe 120 can be configured to perform a collision-avoidance scan path such that the ultrasonic probe 120 will not collide with the test piece 110 and/or the ultrasonic testing environment 105. The scan path used for inspection depends on the material and the purpose of the inspection, for example the scan path can be based on defects or features that need to be found. When a digital twin includes potential movements of the ultrasonic probe 120 and/or the test piece 110, it is easier to perform inspections rapidly and precisely without the risk of potential collisions.

As shown in FIG. 1, the system 100 also includes processor 145. The processor 145 is coupled to controller 135, sensors 140, and display 150. The processor 145 includes executable instructions, which when executed, perform processing necessary to generate a digital twin representation of the ultrasonic testing environment 105. For example, the processor 145 can be configured to transmit instructions to the controller 135 to adjust the location of the probe assembly 115 and/or the ultrasonic probe 120. The processor 145 can receive probe position data from the controller 135 identifying the specific location of the probe assembly 115 and/or the ultrasound probe 120 within the ultrasound testing environment 105. The processor 145 can also be configured to transmit instructions to the sensors 140 to detect the dimensions and geometric features of the ultrasonic testing environment 105 and to the generate coordinate system data associated with the ultrasonic testing environment 105. The coordinate system data may be transmitted from the sensors 140 to the processor 145 and processed to generate the digital twin of the ultrasonic testing environment 105. In some embodiments, the processor can be located remotely from the ultrasonic testing environment 105. In other embodiments, the processor 145 can be co-located with the ultrasonic testing environment 105.

As further shown in FIG. 1, the system 100 includes a display 150. The display 150 is coupled to the processor 145 and includes a graphical user interface displaying the digital twin representation in embodiments of the system including a vision system which will be described later in regard to FIGS. 8 and 9. The display 150 can be, without limitation, any component or functionality configured to provide visual or textual data associated with the generated digital twin representation. For example, the display 150 can include a desktop computer, a laptop, a wireless tablet, or a smart phone and can display a variety of data including probe position data, coordinate system data of the ultrasonic testing environment 105, positioning data related to the test piece 110, and/or multiple paths that can be associated with movements of the probe assembly 115 and/or the ultrasonic probe 120. In some embodiments, the display 150 can be co-located with the ultrasonic testing environment 105 and/or the processor 145 to which it is coupled. In other embodiments, the display 150 can be located remotely from the ultrasonic testing environment 105 and/or the processor 145.

Figure 2:
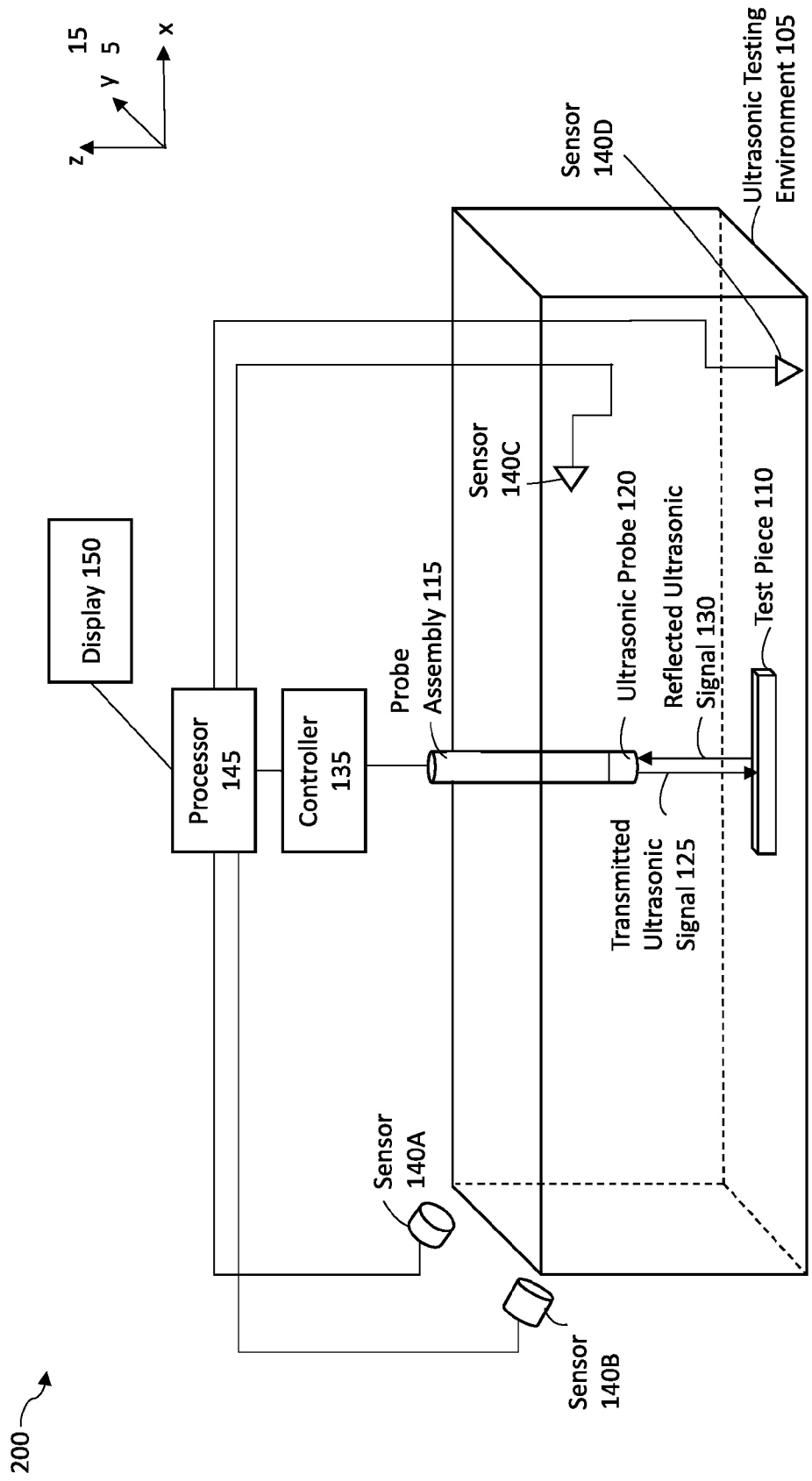
FIG. 2 is a diagram illustrating another exemplary embodiment of a system configured to generate a digital twin representation of an ultrasonic testing environment.

FIG. 2 is a diagram illustrating another exemplary embodiment of a system 200 configured to generate a digital twin representation of the ultrasonic testing environment 105. System 200 includes the same components of the system 100 described in relation to FIG. 1, however, in the system 200 a plurality of embodiments related to the sensors 140 are shown. In one embodiment, the system 200 includes a plurality of sensors 140 that are positioned outside of the ultrasonic testing environment 105. For example, sensors 140A and 140B are positioned outside of (e.g., above) a portion of the ultrasonic testing environment 105. In this way, the sensors 140A and/or 140B can acquire and generate coordinate system data from a location which provides an alternate (e.g., better, enhanced, or different) determination of the coordinate system data to be incorporated into the digital twin representation, as compared to coordinate sensor data acquired by sensors 140 at a location inside the ultrasonic testing environment 105. A user can configure the location of sensors 140 based on the configuration of the ultrasonic testing environment 105, the test piece 110, and/or the objective of the ultrasonic testing being performed.

As further shown in FIG. 2, a second exemplary embodiment of system 200 is shown. The system 200 includes a plurality of sensors 140 located inside and outside of the ultrasonic testing environment 105. For example, sensors 140A and 140B are positioned outside of the ultrasonic testing environment 105, while sensors 140C and 140D are positioned inside the ultrasonic testing environment 105. The sensors can include a combination of tactile and non-tactile sensors. For example, sensors 140A and 140B are non-tactile sensors such as optical, infrared, or ultrasound sensors. The non-tactile sensors are used to generate coordinate system data for use in the digital twin representation based on acquired image data (e.g., in the case of optical sensors) and/or the reflection of signals from the structural boundaries, dimensions, and/or geometric features of the ultrasonic testing environment 105 and/or the test piece 110 (e.g., in the case of infrared and/or ultrasonic sensors). Additionally, or alternatively, the system 200 includes tactile sensors, such as sensors 140C and 140D. Tactile sensors 140C and 140D can determine and generate coordinate system data for use in the digital twin representation based on positioning the tactile sensors 140C and/or 140D in contact with a location or surface corresponding to a geometric feature of the ultrasonic testing environment 105 and/or the test piece 110. In this way, the sensors 140C and 140D can determine the coordinate system data based on a distance traveled from the location of the sensor 140C and/or 140D to the structural boundary or geometric feature being measured. For example, sensors 140C and 140D may be configured with gimballed, robotic arms enabling movement of the sensor 140 along the x, y, and z axes into physical contact with the geometric feature, such as a surface of the test piece 110 or a surface of the ultrasonic testing environment 105, in order to generate the three-dimensional coordinate system data associated with one or more portions of the ultrasonic testing environment 105 and/or the test piece 110.

Figure 3:
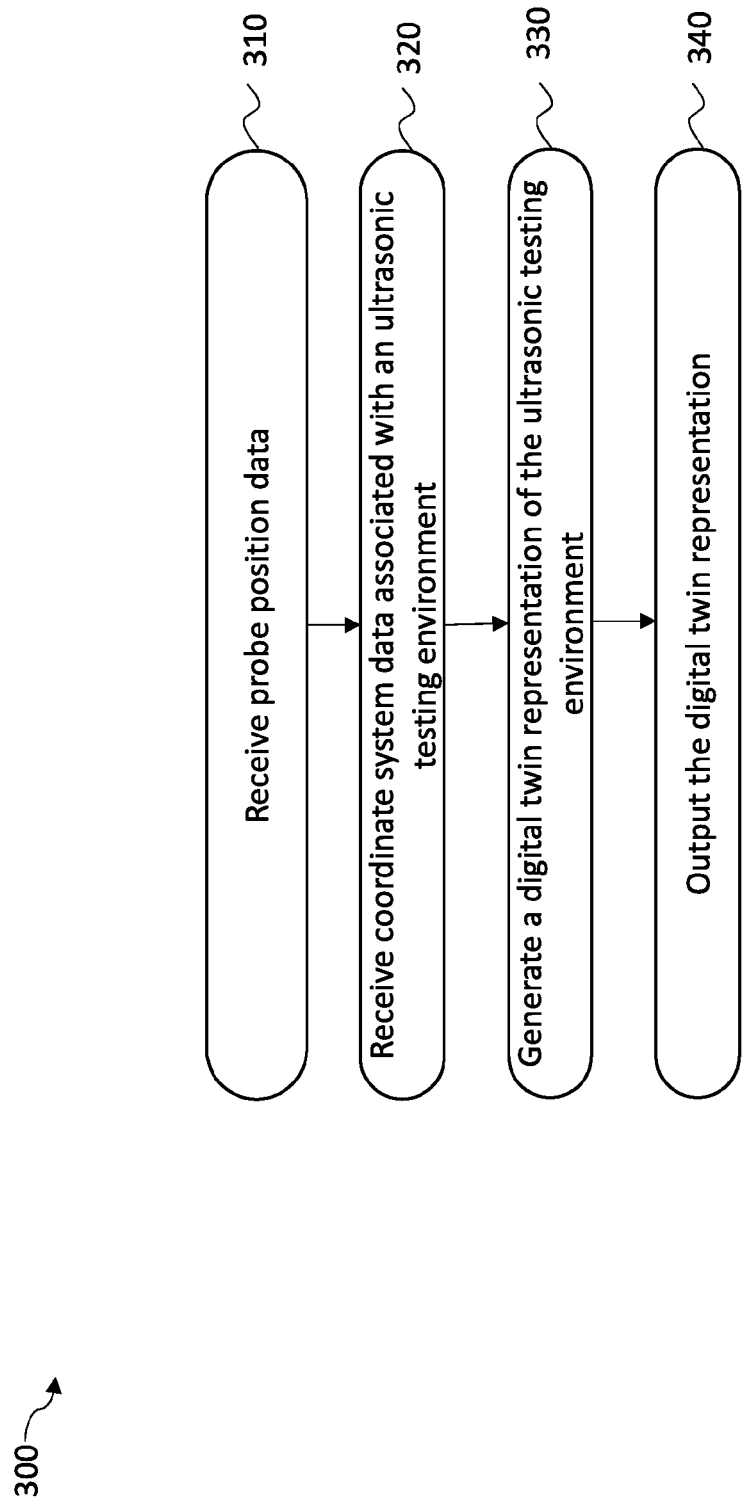
FIG. 3 a flow diagram illustrating an exemplary embodiment of a method for generating a digital twin representation of an ultrasonic testing environment.

FIG. 3 illustrates one exemplary embodiment of a method 300 for generating a digital twin representation of an ultrasonic testing environment. In certain embodiments, the method 300 can be performed by the system 100 of FIG. 1, and specifically by the processor 145.

In operation 310, the processor 145 receives probe position data. The probe position data can be generated by the controller 135 and transmitted to the processor 145 for use in generating a digital twin representation of the ultrasonic testing environment 105. The probe position data can be generated by the controller 135 based on the location, position, orientation, and/or movement of the probe assembly 115 and/or the ultrasonic probe 120 along one or more coordinate system axes (e.g., x, y, and/or z axes). In some embodiments the probe position data can be generated by the plurality of sensors 140 based on sensing the location, position, orientation, and/or movement of the probe assembly 115 and/or the ultrasonic probe 120. The probe position data can include coordinate system data associated with the location, position, orientation, and/or movement of the probe assembly 115 and/or the ultrasonic probe 120 within the ultrasonic testing environment 105. In some embodiments, the probe position data can include one or more of cartesian coordinate data, polar coordinate data, cylindrical coordinate data, spherical coordinate data, homogenous coordinate data, curvilinear coordinate data, log-polar coordinate data, or Plücker coordinate data. In some embodiments, the probe position data can enable determination of one or more paths that the probe assembly 115 and/or the ultrasonic probe 120 may traverse in the ultrasonic testing environment 105. For example, the one or more paths can define a sequence of movements for the probe assembly 115 to traverse along one or more locations in the ultrasonic testing environment 105 in order to accurately perform a scan of the test piece 110 during ultrasonic testing. In some embodiments, the probe position data can be generated by the controller 135 (and/or the sensors 140) in relation to a pre-determined reference point or reference coordinate system associated with the ultrasonic testing environment 105.

In operation 320, the processor 145 receives coordinate system data associated with the ultrasonic testing environment 105. The sensors 140 detect and generate coordinate system data and transmit the coordinate system data to the processor 145 to be incorporated into a digital twin representation of the ultrasonic testing environment 105. The coordinate system data can include a plurality of coordinate system data points which can correspond to one or more locations or geometric features associated with the ultrasonic testing environment 105 and/or the test piece 110. The coordinate system data can describe the dimensional attributes and geometric configuration of the three-dimensional space represented by the ultrasonic testing environment 105 with regards to the x, y, and z axes. In this way, a determination of each specific location within the volumetric space associated with the ultrasonic testing environment 105 can be made in order to generate the digital twin representation of the ultrasonic testing environment 105. The coordinate system data can include one or more of cartesian coordinate data, polar coordinate data, cylindrical coordinate data, spherical coordinate data, homogenous coordinate data, curvilinear coordinate data, log-polar coordinate data, or Plücker coordinate data. Additionally, or alternatively, the processor 145 can receive test piece coordinate data. The test piece coordinate data can be used to generate the digital twin representation. In some embodiments, the test piece coordinate data can include data related to the position of the test piece 110 and/or data associated with the movement of the test piece 110. In some embodiments, the test piece coordinate data can include In operation 330, the processor 145 generates a digital twin representation of the ultrasonic testing environment 105. Based on receiving the probe position data and the coordinate system data, the processor 145 can combine the probe position data describing the location and movements of the probe assembly 115 and/or the ultrasonic probe 120 with the coordinate system data describing the three-dimensional space and geometric features of the ultrasonic testing environment 105 and/or the test piece 110 to generate the digital twin representation. The digital twin representation represents a virtual, three-dimensional model of the ultrasonic testing environment 105 and the objects contained therein (e.g., a test piece 110). In some embodiments, the generated digital twin representation can include the test piece 110. The digital twin representation thus enables a user to visualize the ultrasonic testing environment 105 as coordinate system data, such that any specific location within the digital twin representation has a corresponding physical location in the ultrasonic testing environment 105. In this way, a user can, for example, determine a specific location in the digital twin representation (e.g., a location defined in the coordinate system data) associated with a corresponding location in the physical ultrasonic testing environment 105 so that the user can accurately position the probe assembly 115 and/or ultrasonic probe 120 to conduct ultrasonic testing of the test piece 110. As a result, the user can utilize the digital twin representation to position the probe assembly 115 and/or ultrasonic probe 120, relative to the test piece 110, more accurately than if the user manually positioned the probe assembly 115 and/or ultrasonic probe 120. Manual positioning is prone to positioning errors and collisions between the probe assembly 115 and/or ultrasonic probe and the test piece 110. In some embodiments, the digital twin representation can include one or more locations or regions or paths which correspond to secure locations or non-testing regions within the ultrasonic testing environment 105.

Generating the digital twin representation can also include determining probe position measurements corresponding to the location and orientation of the probe assembly 115 and/or the ultrasonic probe 120 within the ultrasonic testing environment 105. For example, the digital twin representation can include measurement data corresponding to one or more probe position measurements such as a probe elevation measurement. The probe elevation measurement can include a distance measured between a transducer surface configured on the ultrasonic probe 120 and a surface of a test piece 110 (or a surface within the ultrasonic testing environment 105) from which ultrasonic signals are reflected to the ultrasonic probe 120. The probe elevation measurement can be used to determine the height of the probe assembly 115 and/or the ultrasonic probe 120 relative to the test piece 110 (or a surface within the ultrasonic testing environment 105).

The digital twin representation can also include measurement data corresponding to one or more probe position measurements such as a probe angle measurement. The probe angle measurement corresponds to an angle measured between an axis of the ultrasonic probe 120 (or the probe assembly 115) and a surface of the test piece 110 (or a surface within the ultrasonic testing environment 105) from which ultrasonic signals are reflected to the ultrasonic probe 120. The probe angle measurement can be used to determine the orientation of the ultrasonic probe 120 (or the probe assembly 115) relative to an axis along which the probe assembly 115 is oriented.

The digital twin representation can also include a plurality of paths along which the probe assembly 115 and/or the ultrasonic probe 120 traverse within the ultrasonic testing environment 105. For example, based on the coordinate system data and the probe position measurements, the generated digital twin representation can include one or more paths associated with a series of locations the probe assembly 115 (and/or the ultrasonic probe 120) traverses through the ultrasonic testing environment 105 to perform a scan of a test piece 110 or to position the probe assembly 115 (or the ultrasonic probe 120). In this way, each of the plurality of paths can include one or more probe positions corresponding to a specific position of the probe assembly 115 and/or the ultrasonic probe 120 defined according to the coordinate system data of the digital twin representation. For example, the digital twin representation can include one or more paths associated with moving the probe assembly 115 from a storage location to a location suitable for performing an ultrasonic scan of a test piece 110. In another example, the digital twin representation can include one or more paths associated with a series of individual locations that the probe assembly 115 (and/or the ultrasonic probe 120) traverses to perform an ultrasonic scan of the test piece 110.

In operation 340, the generated digital twin representation is provided. For example, the digital twin representation can be output for display, such as on display 150 included in system 100 shown in FIG. 1. The generated digital twin representation can be provided or output and stored locally in a memory or storage component coupled to the processor 145. In some embodiments, the generated digital twin representation is stored remotely from the system 100 and/or the processor 145. The digital twin representation can be provided for import in other modeling or computer-aided design (CAD) environments or workflows.

Figure 4:
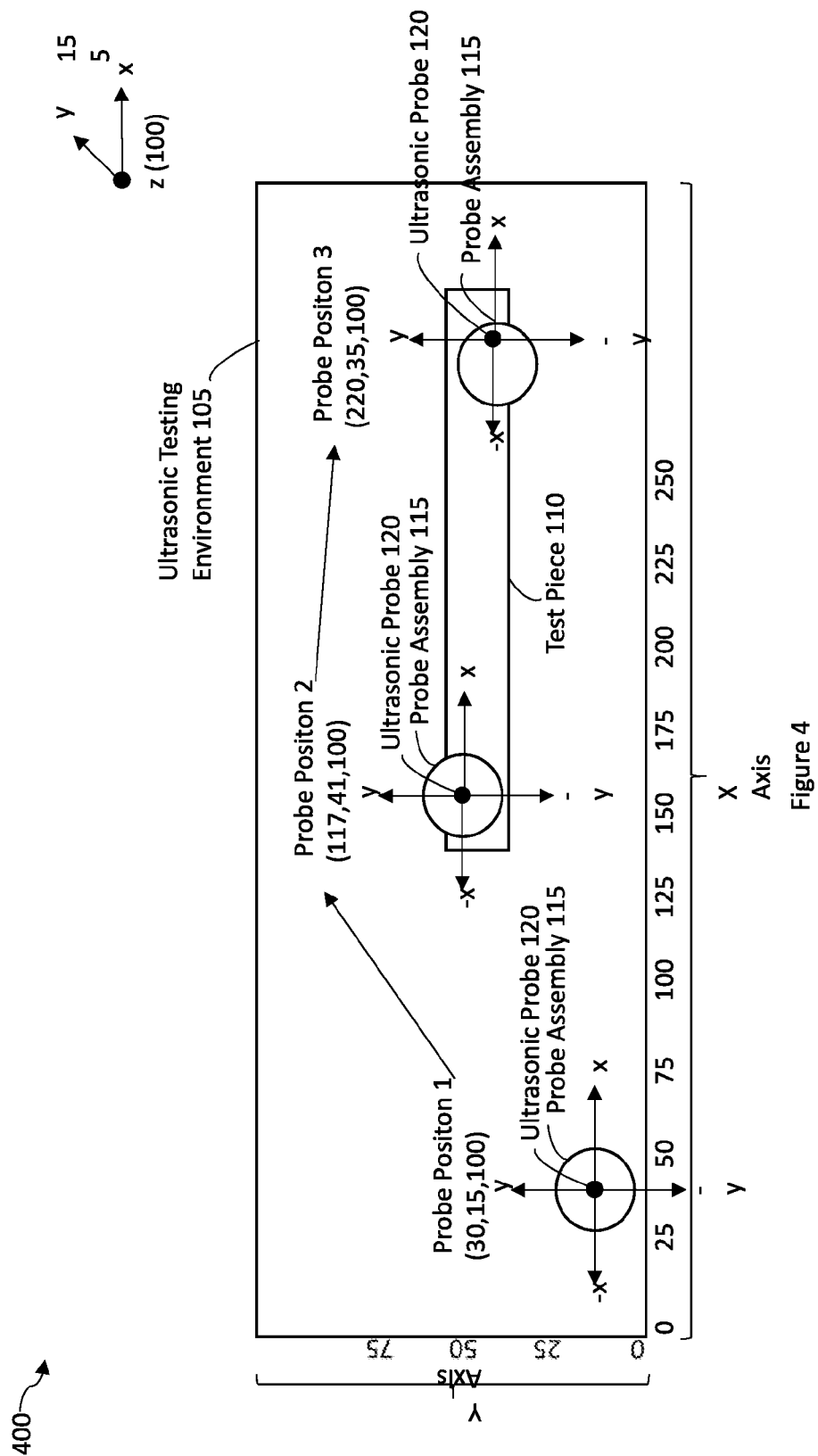
FIG. 4 is a diagram illustrating an exemplary embodiment of generating probe position data associated with the ultrasonic testing environment.

FIG. 4 illustrates an exemplary embodiment 400 of generated probe position data associated with the ultrasonic testing environment 105. As described above in relation to operation 310 of method 300, the processor 145 receives probe position data. The probe position data is generated by the controller 135 and/or the sensors 140. The probe position data corresponds to the location of the probe assembly 115 and/or the ultrasonic probe 120 within the ultrasonic testing environment 105 and is presented as coordinate system data (e.g., a location defined in regards to the x, y, and z axes). As shown in FIG. 4, three probe positions are shown (e.g., probe positions 1-3) in a top-down view of the ultrasonic testing environment 105 which includes test piece 110 positioned therein. As further shown, a coordinate system reference 155 is illustrated showing that in the top-down view, the x and y axis data is being determined at a given location along the z axis (e.g., z=100). In some embodiments, exemplary embodiment 400 may be provided in a graphical user interface of the vision system 155 which will be described in more detail later in relation to FIG. 9. The GUI can display live-image data corresponding to the distance between the ultrasonic probe 120 and the test piece 110, for example an A-scan representation.

As shown in FIG. 4, three probe positions are shown in a top-down view of the ultrasonic testing environment 105. Probe positions 1-3 can be determined by the controller 135 in relation to the location of the probe assembly 115 and/or the ultrasonic probe 120 along the x and y axes based on the digital twin representation. In some embodiments the scale or range of values associated with the x, y, and z axes can be determined by the controller 135, the sensors 140, and/or can be manually provided based on empirically-determined or previously determined coordinate system data associated with the ultrasonic testing environment 105.

As further shown in FIG. 4, the controller 135 can execute instructions to begin a scan of a test piece 110 starting from probe position 1 within the ultrasonic testing environment 105. The controller 135 can determine that at probe position 1, the ultrasonic probe 120 is centered within the probe assembly 115 and located at a position corresponding to coordinates 30, 15, 100 (e.g., x, y, z). The x and y coordinate values (e.g., x=30 and y=15) associated with probe position 1 correspond to the x and y axes values at which the ultrasonic probe 120 is located. The z coordinate value (e.g., z=100) illustrates the location along the z axis at which the ultrasonic probe 120 is located.

As the controller 135 repositions the probe assembly 115 and the ultrasonic probe 120 from probe position 1 to probe position 2, so that it is in closer proximity to the test piece 110, the probe position data is updated. For example, the ultrasonic probe 120 remains centered within the probe assembly 115 and the ultrasonic probe 120 is now located at a position corresponding to coordinates 117, 41, 100. Similarly to probe position 1, the z coordinate value (e.g., z=100)

illustrates that the location along the z axis at which the ultrasonic probe 120 is located remains the same to indicate no change in height or elevation (along the z axis) has occurred between probe positions 1 and 2.

As the controller 135 repositions the probe assembly 115 and the ultrasonic probe 120 from probe position 2 to probe position 3, the probe position data is further updated. For example, the ultrasonic probe 120 has now been positioned within the probe assembly 115 in an off-center location. Adjusting the location of the ultrasonic probe 120 in relation to the probe assembly 115 can allow for more accurate ultrasonic scans due to adjusting the angle and orientation of the transducer surface within the ultrasonic probe 120 relative to the probe assembly 115. Depending on the size and shape of the test piece 110, adjustments in the probe positioning (including the position of the probe assembly 115 and the position of the ultrasonic probe 120 relative to the probe assembly 115) may be necessary to satisfactorily scan the test piece 110. In probe position 3, the controller 135 has located the ultrasonic probe 120 at a position corresponding to coordinates 220, 35, 100. Similarly to probe position 1 and 2, the z coordinate value of probe position 3 (e.g., z=100) illustrates that the location along the z axis at which the ultrasonic probe 120 is located remains the same to indicate no change in height or elevation (along the z axis) has occurred in probe positions 1, 2 and 3. The probe position data associated with each of probe positions 1-3 may be output by the controller 135 to the processor 145 and used to generate a digital twin representation of the ultrasonic testing environment 105.

Figure 5:
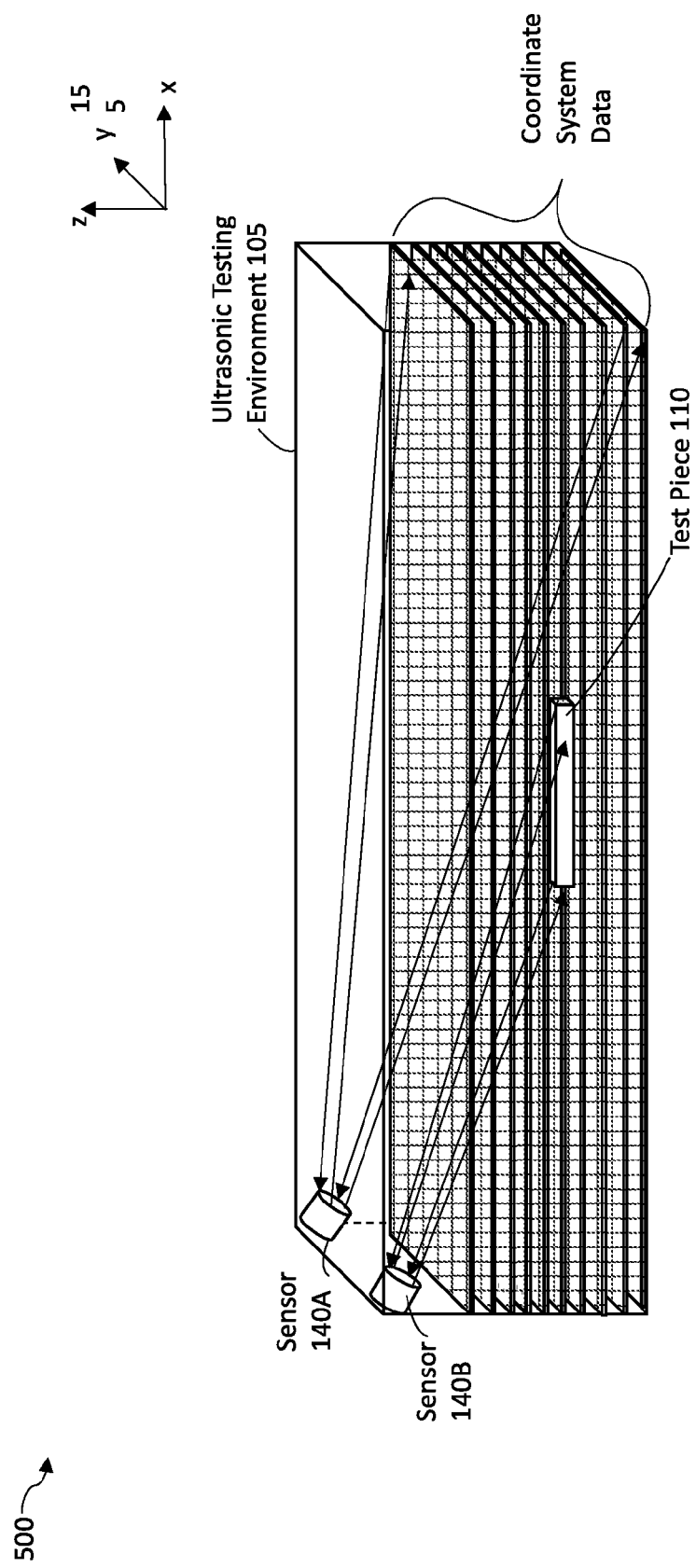
FIG. 5 is a diagram illustrating an exemplary embodiment of generating coordinate system data associated with the ultrasonic testing environment.

As shown in FIG. 5, the sensors 140A and 140B can generate coordinate system data corresponding to the ultrasonic testing environment 105 and/or the test piece 110. The generated coordinate system data is received by the processor 145 and processed to generate a digital twin representation of the ultrasonic testing environment 105. As described above the sensors 140 can be configured to transmit signals into the ultrasonic testing environment 105. Reflected signals are received at the sensors 140 from one or more geometric structures associated with the ultrasonic testing environment 105 and/or the test piece 110. For example, as shown in FIG. 5, the sensor 140A transmit signals toward the opposite wall of the ultrasonic testing environment 105 on which the sensor 140A is positioned. Upon contact with the opposite wall, the signals are reflected back to sensor 140A and a determination of coordinate system data associated with the opposite wall is made. The sensor 140A can repeatedly determine coordinate system data of the ultrasonic testing environment at multiple locations in order to develop a three-dimensional model of the dimensions and geometric structures related to the ultrasonic testing environment 105. As shown in FIG. 5, a plurality of x-y axis planes are shown extending along the z axis space to illustrate how the sensors 140 generate the coordinate system data used in the digital twin representation. The sensors 140 can generate coordinate system data corresponding to individual volumetric units of space that are associated with the physical dimensions and geometric structure of the ultrasonic testing environment 105. In this way, the coordinate system data generated by the sensors 140 can be used to generate a digital twin representation depicting the same physical dimensions and geometric structures.

As further shown in FIG. 5, the sensor 140B can similarly transmit signals and receive reflected signals in order to generate coordinate system data. Sensor 140B can be configured to generate coordinate system data associated with the dimensions and geometric features of the test piece 110. The sensor 140B can initially detect the dimensions and location of the geometric features of the test piece 110 at a central location within the ultrasonic testing environment 105, along the bottom surface. Upon receiving the reflected signals at a plurality of location from test piece 110, the sensor 140B can determine the coordinate system data corresponding to the test piece 110. The coordinate system data can be used to generate the digital twin representation of the test piece 110 within the digital twin representation of the ultrasonic testing environment 105. In this way, the sensors 140 determine coordinate system data for a variety of geometric features and dimensions within the ultrasonic testing environment 105. The coordinate system data can be utilized to form a virtual, three-dimensional digital twin representation of the ultrasonic testing environment 105 as well as any test pieces 110 therein. The digital twin representation can then be used to plan and perform a series of probe positioning adjustments as part of scanning a test piece 110 during ultrasonic testing.

Figure 6:
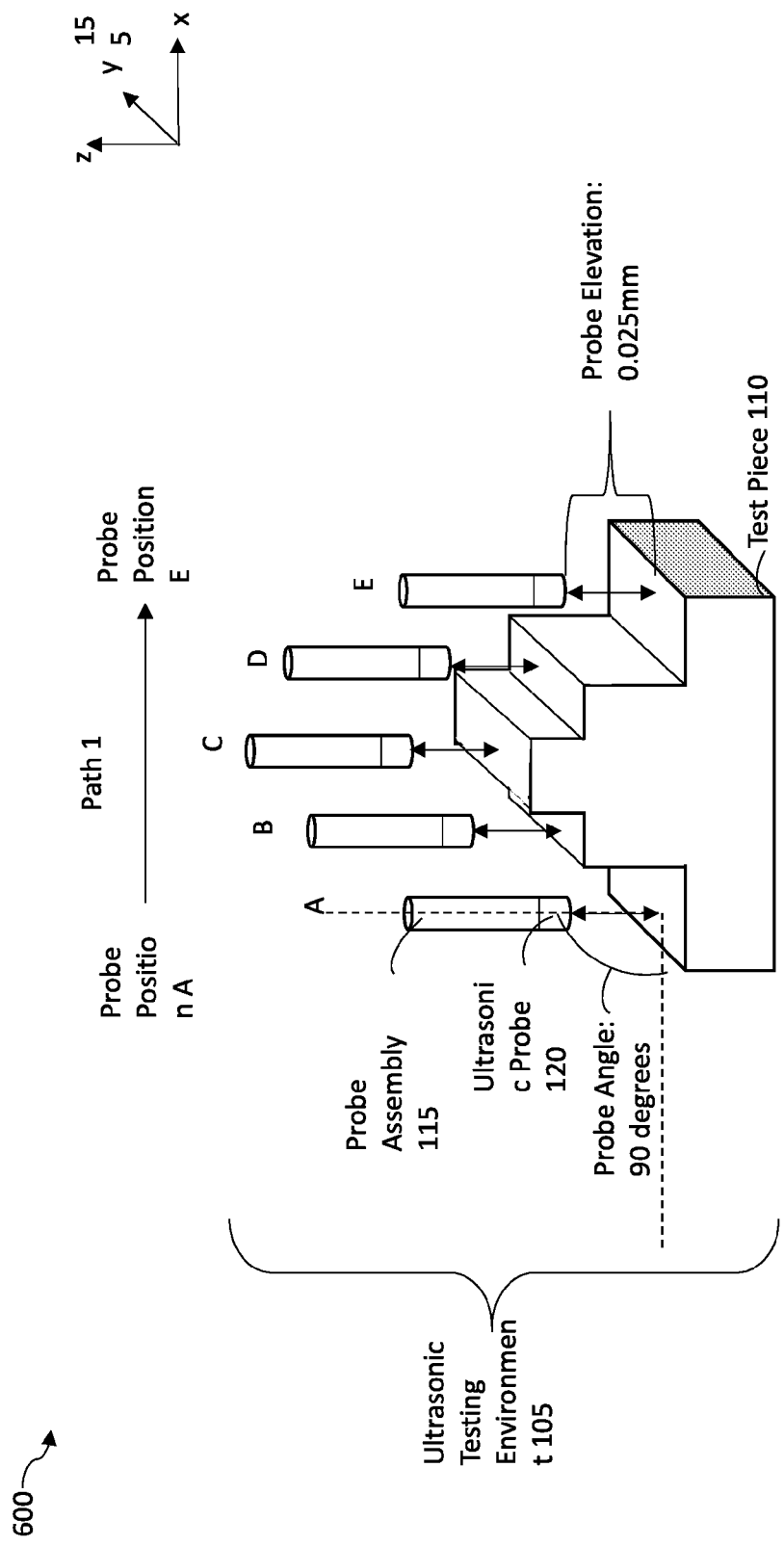
FIG. 6 is a diagram illustrating an exemplary embodiment of a probe assembly traversing a path included in the digital twin representation of the ultrasonic testing environment.

FIG. 6 is an exemplary embodiment 600 of a probe assembly 115 and ultrasonic probe 120 traversing a path (e.g., path 1) included in the digital twin representation of the ultrasonic testing environment 105 as part of scanning a test piece 110 during ultrasonic testing. As shown in FIG. 6, a test piece 110 with stair-stepped geometric features is located within the ultrasonic testing environment 105. Based on generating a digital twin representation of the test piece 110 according to the system and methods described previously in relation to FIGS. 3-5, a path of multiple probe positions can be determined to accurately scan the test piece 110 during ultrasonic testing.

As shown in FIG. 6, a stair-stepped test piece 110 is arranged within the ultrasonic testing environment 105. Based on the digital twin representation of test piece 110, a series of probe positions can be determined to scan the test piece 110 during ultrasonic testing. The series of probe positions (e.g., probe positions A-E) are associated with a path (e.g., Path 1) and are included in the digital twin representation of the test piece 110. Based on the digital twin representation of the test piece 110, the processor 145 transmits instructions to the controller 135 to conduct ultrasonic testing of the test piece 110 by traversing path 1. The controller 135 scans the test piece 110 starting in probe position A and moves the probe assembly 115 and/or the ultrasonic probe 120 as shown through probe positions B-E, thereby scanning the test piece 110 in each of the five probe positions.

As further shown in FIG. 6, two probe position measurements have been determined for each probe position based on the generated digital twin representation of the test piece 110, a probe angle measurement, and a probe elevation measurement. The processor 145 has determined, based on the coordinate system data used to generate the digital twin representation of the test piece 110, that upon traversing Path 1, the controller 135 should position the probe assembly 115 and/or the ultrasonic probe 120 at a consistent probe elevation of 0.025 mm in each of the probe positions A-E. As a result, the controller 135 positions the probe assembly 115 and/or the ultrasonic probe 120 such that the transducer surface of the ultrasonic probe 120 is 0.025 mm above the surface of the test piece 110 in each of the five probe positions A-E. As further shown, the processor 145 has determined that the probe angle measurement should be 90 degrees (or orthogonal) based on the generated digital twin representation of the test piece 110. The probe angle measurement corresponds to the angle measured between the axis of the ultrasonic probe 120 (and the probe assembly 115 to which it is coupled) and the surface of the surface of the test piece 110. Due to the flat, planar shape of each of the five stair step surfaces of test piece 110 as represented in the digital twin representation, the processor 145 has determined that the controller 135 should position the probe assembly 115 and/or the ultrasonic probe 120 such that the probe angle measurement is 90 degrees at each of the probe positions A-E corresponding to path 1. Thus, as determined based on the digital twin representation of the test piece 110, the ultrasonic testing can be performed with the probe assembly 115 and/or the ultrasonic probe 120 positioned relative to the surfaces of the test piece 110 such that the probe angle measurement and the probe elevation measurement are consistent (e.g., 90 degrees and 0.025 mm, respectively) at each probe position A-E associated with path 1. A user can thereby perform the ultrasonic testing of the test piece 110 more efficiently with less risk of error or collision as a result of the probe position measurements determined when generating the digital twin representation of the test piece 110.

Figure 7:
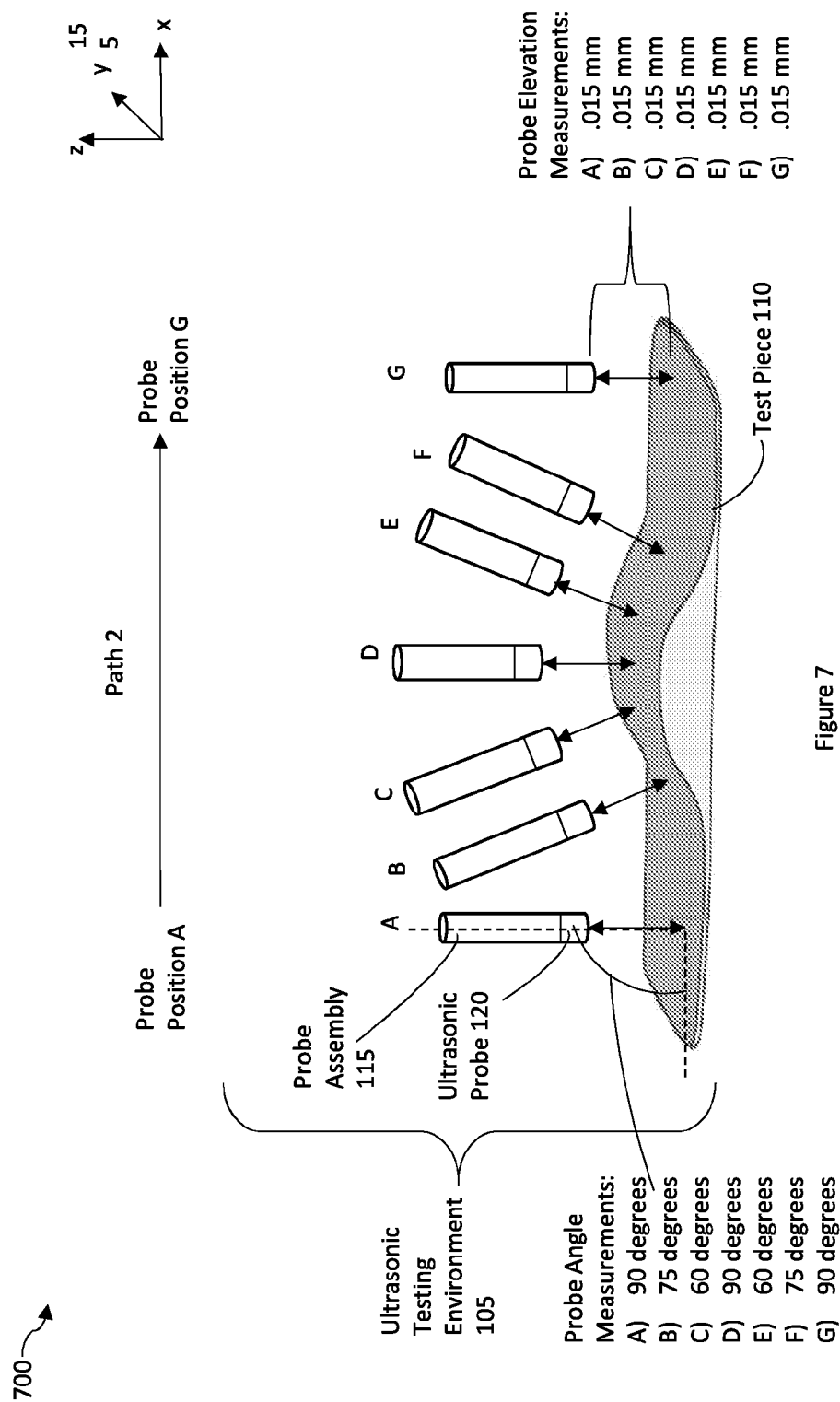
FIG. 7 is a diagram illustrating another exemplary embodiment of a probe assembly traversing a path included in the digital twin representation of the ultrasonic testing environment.

FIG. 7 is an exemplary embodiment 700 of a probe assembly 115 and ultrasonic probe 120 traversing a path (e.g., path 2) included in the digital twin representation of the ultrasonic testing environment 105 as part of scanning a test piece 110 during ultrasonic testing. As shown in FIG. 7, a test piece 110 with curved geometric features is located within the ultrasonic testing environment 105. Based on generating a digital twin representation of the test piece 110 according to the system and methods described previously in relation to FIGS. 3-5, a path of multiple probe positions can be determined to accurately scan the test piece 110 during ultrasonic testing.

As shown in FIG. 7, a curved test piece 110 is arranged within the ultrasonic testing environment 105. Based on the digital twin representation of test piece 110, a series of probe positions can be determined to scan the test piece 110 during ultrasonic testing. The series of probe positions (e.g., probe positions A-G) are associated with a path (e.g., Path 2) and are included in the digital twin representation of the test piece 110. Based on the digital twin representation of the test piece 110, the processor 145 transmits instructions to the controller 135 to conduct ultrasonic testing of the test piece 110 by traversing path 2. The controller 135 scans the test piece 110 starting in probe position A and moves the probe assembly 115 and/or the ultrasonic probe 120 as shown through probe positions B-G, thereby scanning the test piece 110 in each of the seven probe positions.

As further shown in FIG. 7, two probe position measurements have been determined for each probe position based on the generated digital twin representation of the test piece 110, a probe angle measurement, and a probe elevation measurement (e.g., as shown in the data tables at the bottom left and bottom right of FIG. 7). The processor 145 has determined, based on the coordinate system data used to generate the digital twin representation of the test piece 110, that upon traversing Path 2, the controller 135 should position the probe assembly 115 and/or the ultrasonic probe 120 at a consistent probe elevation of 0.015 mm in each of the probe positions A-G. As a result, the controller 135 positions the probe assembly 115 and/or the ultrasonic probe 120 such that the transducer surface of the ultrasonic probe 120 is 0.015 mm above the surface of the test piece 110 in each of the seven probe positions A-G. In some embodiments, the probe elevation measurement can vary and can be different at each probe position in a path. As further shown, the processor 145 has determined that the probe angle measurement should vary in one or more probe positions based on the curved surface shape of a portion of the test piece 110 and the generated digital twin representation of the test piece 110. The probe angle measurement corresponds to the angle measured between the axis of the ultrasonic probe 120 (and the probe assembly 115 to which it is coupled) and the surface of the surface of the test piece 110. Due to the curved, non-planar shape of the test piece 110 as represented in the digital twin representation, the processor 145 has determined that the controller 135 should position the probe assembly 115 and/or the ultrasonic probe 120 such that the probe angle measurement is initially 90 degrees when starting the scan along Path 2 in probe position A. Probe positions B and C are determined from the digital twin representation to require a different probe angle measurement (e.g., 75 and 60 degrees, respectively) to account for the sloped surface at this location of the test piece 110. As the controller 135 continues to adjust the location of the probe assembly 115 and/or the ultrasonic probe 120 while conducting the scan along path 2, the probe angle measurement is determined to be 90 degrees at probe position D. Progressing through the remaining probe positions associated with path 2, the controller 135 positions the probe assembly 115 and/or the ultrasonic probe 120 at 60 and 75 degrees relative to the surface of the test piece 110 in probe positions E and F, respectively, before returning to the probe assembly 115 and/or the ultrasonic probe 120 to a 90 degree probe angle measurement in probe position G located on the flat surface of the test piece 110. Thus, as determined based on the digital twin representation of the test piece 110, the ultrasonic testing can be performed with the probe assembly 115 and/or the ultrasonic probe 120 positioned relative to the surfaces of the test piece 110 such that the probe angle measurement varies at one or more probe positions A-G associated with path 2. A user can thereby perform the ultrasonic testing of the test piece 110 more efficiently with less risk of error or collision as a result of the probe position measurements determined when generating the digital twin representation of the test piece 110 which can include irregular, sloping or curved geometric features.

Figure 8:
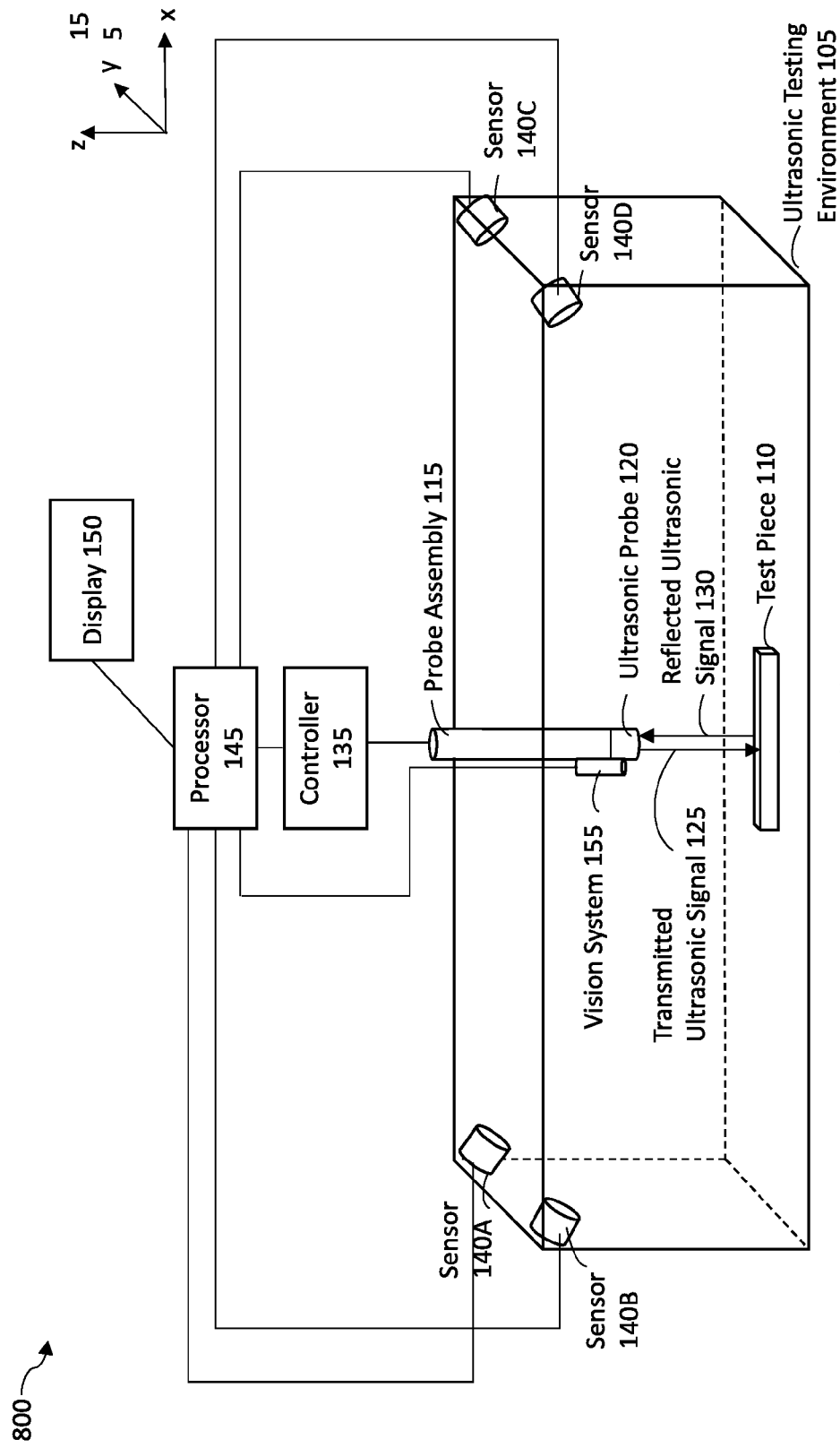
FIG. 8 is a diagram illustrating a system, including a vision system, configured to generate a digital twin representation for use in ultrasonic testing.

FIG. 8 is a diagram illustrating an additional embodiment of the system 100 of FIG. 1. The system 800 of FIG. 8 includes a vision system 155 configured to generate a digital twin representation for use in ultrasonic testing. As shown in FIG. 8, the system 800 is similar to the system 100 of FIG. 1, except the system 800 further includes a vision system 155. The vision system 155 is coupled to the probe assembly 115 and the processor 145. The vision system 155 is configured to generate a live-view image of the ultrasonic probe 120 in relation to the test piece 110 within the ultrasonic testing environment 105. In some embodiments, the vision system 155 can include an optical vision system. In other embodiments, the vision system 155 can include an ultrasound vision system. As seen in FIG. 8, the vision system 155 is configured to provide a top-down view of the ultrasonic probe 120 as it is positioned within the ultrasonic testing environment 105 in relation to the test piece 110. In some embodiments, the vision system 155 can be configured in other locations within the ultrasonic testing environment 105 and may not be coupled to the probe assembly 115. These alternate locations can provide a side-view or a bottoms-up view depending on the location of the vision system 155 relative to the test piece 110.

The vision system 155 can be configured to capture a live-view image of the ultrasonic testing environment 105 and present the live-view image to a user in a graphical user interface displaying the digital twin representation of the ultrasonic testing environment 105. The graphical user interface can display the live-view image with additional information such as the absolute coordinates of the ultrasonic probe 120, the test piece 110 as well as multiple probe position measurements (e.g., probe elevation and probe angle measurements).

Figure 9:
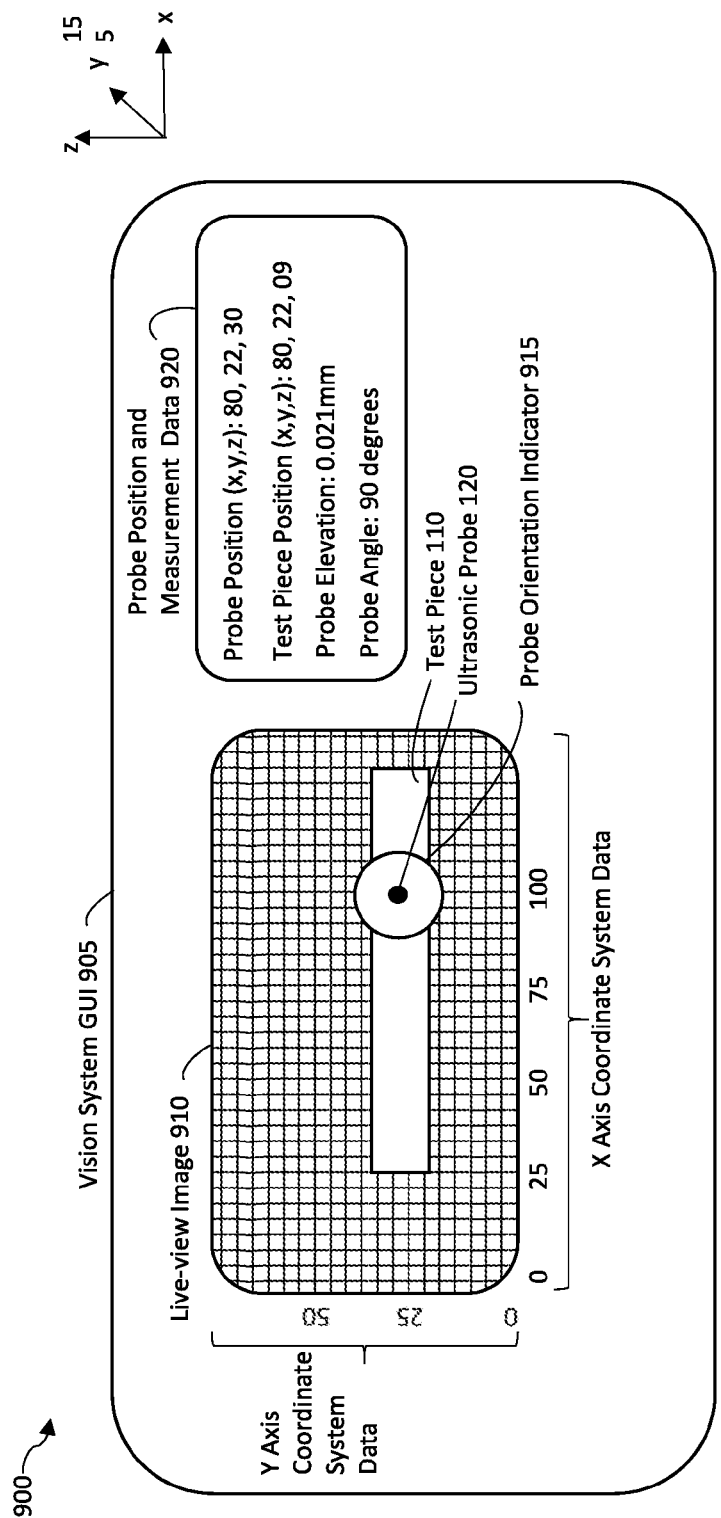
FIG. 9 is a diagram illustrating a graphical user interface included in the vision system.

FIG. 9 is a diagram 900 illustrating a graphical user interface 905 included in the vision system 155 described in relation to FIG. 8. As shown in FIG. 9, the graphical user interface (GUI) 905 displays a live-image view 910 and probe position and measurement data 920. The live-image view 910 displays the image acquired via the vision system 155 overlaid upon the coordinate system data of the generated digital twin representation. For example, as shown in FIG. 9, the live-image view 910 includes x-axis coordinate system data values ranging from 0 to 100 and y-axis coordinate values ranging from 0 to 50. These axis coordinate system data values represent the coordinate system data associated with the digital twin representation of the ultrasonic testing environment. As further shown in FIG. 9, the live-image view 910 also displays the test piece 110, the ultrasonic probe 120, and a probe orientation indicator 915. The probe orientation indicator 915 can display the location of the ultrasonic probe 120 relative to a probe assembly. As shown in FIG. 9, the probe orientation indicator 915 illustrates that the ultrasonic probe 120 is centered relative to the probe assembly to which it is coupled. In some embodiments, the probe orientation indicator illustrates that the ultrasonic probe 120 is not centered relative to a probe assembly, for example as illustrated in FIG. 4 describing probe position 3. The probe orientation indicator 915 can enable a user to position the ultrasonic probe 120 by dragging and dropping the probe orientation indicator 915 to a desired location within the digital twin representation corresponding to a physical location in an ultrasonic testing environment. In this way, the vision system 155 and the vision system GUI 905 provide a user with direct feedback for faster operation of an ultrasonic testing environment. Optionally, the ultrasound live-image can be displayed on the same or a different user interface. From the ultrasound signal the distance between the ultrasonic probe 120 and the test piece 110 can be derived, among other information, As further shown in FIG. 9, the vision system GUI 905 also includes probe position and measurement data 920. The probe position and measurement data 920 include, but is not limited to, absolute coordinates of the ultrasonic probe 120, absolute coordinates of the test piece 110, a probe elevation measurement, and a probe angle measurement. For example, as shown in the probe position and measurement data 920, the absolute coordinates (x, y, z) of the probe position in the ultrasonic testing environment 105 are 80, 22, 30, and the absolute coordinates (x, y, z) of the test piece 110 at the exact location over which the ultrasonic probe 120 is positioned are 80, 22, 09. As further shown in the probe position and measurement data 920, the probe elevation measurement is 0.021 mm and corresponds to the difference between the z-axis values of the probe position (e.g., 30) and the test piece position (e.g., 09). The probe position and measurement data 920 also displays the probe angle (e.g., 90 degrees). Additionally, or alternatively, the vision system GUI 905 can display ultrasound data based on emitting ultrasound signals with respect to the test piece 110 and/or the ultrasonic testing environment 105. For example, the vision system GUI 905 can display an A-scan representation of the test piece 110 and/or the ultrasonic testing environment 105. The live-image view 910 and the probe position and measurement data 920 can provide a user with direct feedback for more precise and accurate positioning of the ultrasonic probe 120 in relation to a test piece. The feedback can enable inexperienced users to perform the ultrasonic testing and the required positioning of the ultrasonic probe 120 without risk of damaging the equipment in ultrasonic testing environments that do not include such a vision system 155.

Additionally, the vision system 155 can enable remote operation of the ultrasonic testing environment 105. A remote facility can receive the digital twin representation and the live-image view in a remotely located display, such as display 150 of FIG. 1 that is not co-located with the ultrasonic testing environment 105. Such a distributed configuration can enable more skilled personnel at the remote location to perform the ultrasonic testing scans with the support of less skilled personnel at the location where the ultrasonic testing environment 105 is situated.

Exemplary technical effects of the methods, systems, and devices described herein include, by way of non-limiting example, generating a digital twin representation of an ultrasonic testing environment. In one aspect, the generated digital twin representation can include coordinate system data corresponding to specific geometric features of the ultrasonic test environment and any test pieces therein. In another aspect, the digital twin representation can include coordinate system data associated with the positions and movements of an ultrasonic probe such that the digital twin representation can be used to accurately conduct ultrasonic testing requiring precise, small scale movements in a physical ultrasonic testing environment. In this manner, ultrasonic testing may be performed more quickly and more accurately regardless of the skill of an operator.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, such as display 150, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Certain exemplary embodiments are described to provide an overview of the principles of the structure, function, manufacture, and use of the systems, devices, and methods disclosed herein. One or more examples of these embodiments are illustrated in the accompanying drawings. The features illustrated or described in connection with one exemplary embodiment can be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A system, comprising:
   a probe assembly coupled to one or more probe assembly controllers configured to control the probe assembly, the probe assembly including an ultrasonic probe coupled to one or more probe controllers configured to control the ultrasonic probe, the ultrasonic probe configured to transmit ultrasonic signals and receive reflected ultrasonic signals;
   a plurality of sensors configured to generate coordinate system data associated with an ultrasonic testing environment, the coordinate system data corresponding to one or more geometric features of the ultrasonic testing environment and a test piece within the ultrasonic testing environment;
   a vision system including a camera or an ultrasound transducer affixed to the probe assembly and configured to generate a live-view image of the ultrasonic probe and the test piece; and
   a processor configured with executable instructions which when executed cause the processor to,
      receive three-dimensional probe position data, from the one or more probe assembly controllers and the one or more probe controllers, receive coordinate system data associated with the ultrasonic testing environment, receive the live-view image from the vision system, generate a digital twin representation of the ultrasonic testing environment corresponding to the coordinate system data and the probe position data, wherein the generated digital twin representation is a three-dimensional digital model of the ultrasonic testing environment and generating the digital twin representation includes determining a plurality of probe position measurements and a plurality of paths to be included in the digital twin representation, the plurality of paths including one or more paths along which the probe assembly and/or the ultrasonic probe can be configured to traverse within the ultrasonic testing environment, generate a graphical user interface (GUI) including the live-view image of the ultrasonic probe including a probe orientation indicator and textual data characterizing a current location of the ultrasonic probe relative to the probe assembly based on the determined plurality of probe position measurements, receive a user interaction within the GUI moving the probe orientation indicator to a desired position within the coordinate system of the generated digital twin representation, and positioning, via the one or more probe assembly controllers and the one or more probe controllers, the ultrasonic probe at a physical location in the ultrasonic testing environment corresponding to the desired position within the coordinate system of the generated digital twin representation.

2. The system of claim 1, wherein the GUI further includes the plurality of probe position measurements and one or more test piece position measurements, the one or more test piece position measurements determined based on the coordinate system data.

3. The system of claim 1, wherein the plurality of probe position measurements include a probe elevation measurement corresponding to a distance measured between a transducer surface of the ultrasonic probe and a surface of the test piece from which ultrasonic signals are reflected to the ultrasonic probe.

4. The system of claim 1, wherein the plurality of probe position measurements include a probe angle measurement corresponding to an angle measured between an axis of the ultrasonic probe and a surface of the test piece from which ultrasonic signals are reflected to the ultrasonic probe.

5. The system of claim 1, wherein the coordinate system data includes one or more of cartesian coordinate data, polar coordinate data, cylindrical coordinate data, spherical coordinate data, homogenous coordinate data, curvilinear coordinate data, log-polar coordinate data, or Plücker coordinate data.

6. The system of claim 1, wherein the plurality of sensors include tactile and non-tactile sensors.

7. The system of claim 6, wherein the plurality of sensors are positioned inside or outside the ultrasonic testing environment.

8. The system of claim 1, wherein the ultrasonic test environment can be operated based on the digital twin representation to perform ultrasonic scans of the test piece from a location remote to a location of the ultrasonic test environment.

9. The system of claim 1, wherein the processor is further configured to generate the digital twin representation based on receiving test piece coordinate data.

10. The system of claim 1, wherein the plurality of paths includes one or more of a linear scan path, an irregular scan path, and/or a scan path determined to avoid collision of the ultrasonic probe and the ultrasonic testing environment or test piece.

11. A method comprising:

receiving, by a processor of a computing device, three-dimensional probe position data from one or more probe assembly controllers coupled to the computing device and from one or more probe controllers, the one or more probe controllers coupled to the computing device and to an ultrasonic probe included in a probe assembly, wherein the one or more probe assembly controllers are configured to control the probe assembly, the one or more probe controllers are configured to control the ultrasonic probe, and the ultrasonic probe is configured to transmit ultrasonic signals and to receive reflected ultrasonic signals;

receiving, by the processor of the computing device, coordinate system data associated with an ultrasonic testing environment and corresponding to one or more geometric features of the ultrasonic testing environment and a test piece within the ultrasonic testing environment, the coordinate system data generated by a plurality of sensors coupled to the computing device;

receiving, by the processor of the computing device, a live-view image of the ultrasonic probe and the test piece from vision system including a camera or an ultrasound transducer affixed to the probe assembly;

generating, by the processor of the computing device, a digital twin representation of the ultrasonic testing environment corresponding to the coordinate system data and to the three-dimensional probe position data, wherein the generated digital twin representation is a three-dimensional digital model of the ultrasonic testing environment and generating the digital twin representation includes determining a plurality of probe position measurements and a plurality of paths to be included in the digital twin representation, the plurality of paths including one or more paths along which the probe assembly and/or the ultrasonic probe can be configured to traverse within the ultrasonic testing environment;

generating, by the processor of the computing device, a graphical user interface (GUI), on a display of the computing device, the GUI including the live-view image of the ultrasonic probe including a probe orientation indicator and textual data characterizing a current location of the ultrasonic probe relative to the probe assembly based on the determined plurality of probe position measurements;

receiving a user interaction within the GUI moving the probe orientation indicator to a desired position within the coordinate system of the generated digital twin representation; and positioning, via the one or more probe assembly controllers and the one or more probe controllers, the ultrasonic probe at a physical location in the ultrasonic testing environment corresponding to the desired position within the coordinate system of the generated digital twin representation.

12. The method of claim 11, wherein the GUI further includes the plurality of probe position measurements and one or more test piece position measurements, the one or more test piece position measurements determined based on the coordinate system data.

13. The method of claim 11, wherein the plurality of probe position measurements include a probe elevation measurement corresponding to a distance measured between a transducer surface of the ultrasonic probe and a surface of the test piece from which ultrasonic signals are reflected to the ultrasonic probe.

14. The method of claim 11, wherein the plurality of probe position measurements include a probe angle measurement corresponding to an angle measured between an axis of the ultrasonic probe and a surface of the test piece from which ultrasonic signals are reflected to the ultrasonic probe.

15. The method of claim 11, wherein the coordinate system data includes one or more of cartesian coordinate data, polar coordinate data, cylindrical coordinate data, spherical coordinate data, homogenous coordinate data, curvilinear coordinate data, log-polar coordinate data, or Plücker coordinate data.

16. The method of claim 11, wherein the plurality of sensors include tactile and non-tactile sensors.

17. The method of claim 16, wherein the plurality of sensors are positioned inside or outside the ultrasonic testing environment.

18. The method of claim 11, wherein the processor of the computing device is configured to operate the ultrasonic test environment based on the digital twin representation to perform ultrasonic scans of the test piece from a location remote from a location of the ultrasonic test environment.

19. The method of claim 11, wherein the processor of the computing device is further configured to generate the digital twin representation based on receiving test piece coordinate data.

20. The method of claim 11, wherein the plurality of paths includes one or more of a linear scan path, an irregular scan path, and/or a scan path determined to avoid collision of the ultrasonic probe and the ultrasonic testing environment or test piece.

21. A device comprising:
a display;
one or more probe controllers coupled to a probe assembly including an ultrasonic probe, the one or more probe controllers configured to control the ultrasonic probe, wherein the ultrasonic probe is configured to transmit ultrasonic signals and to receive reflected ultrasonic signals;
one or more probe assembly controllers configured to control the probe assembly;
a processor coupled to the display, the one or more probe controllers and the one or more probe assembly controllers; and
a memory coupled to the processor and storing computer-readable executable instructions, which when executed by the processor cause the processor to perform operations including,
receiving three-dimensional probe position data, from the one or more probe assembly controllers and by the one or more probe controllers;
receiving coordinate system data associated with an ultrasonic testing environment and corresponding to one or more geometric features of the ultrasonic testing environment and a test piece within the ultrasonic testing environment, the coordinate system data generated by a plurality of sensors coupled to the processor;
receiving a live-view image of the ultrasonic probe and the test piece from a vision system including a camera or an ultrasound transducer affixed to the probe assembly;
generating a digital twin representation of the ultrasonic testing environment corresponding to the coordinate system data and the probe position data, wherein the generated digital twin representation is a three-dimensional digital model of the ultrasonic testing environment and generating the digital twin representation includes determining a plurality of probe position measurements and a plurality of paths to be included in the digital twin representation, the plurality of paths including one or more paths along which the probe assembly and/or the ultrasonic probe can be configured to traverse within the ultrasonic testing environment;
providing a graphical user interface (GUI) to the display, the GUI including the live-view image of the ultrasonic probe including a probe orientation indicator and textual data characterizing a current location of the ultrasonic probe relative to the probe assembly based on the determined plurality of probe position measurements;
receiving a user interaction within the GUI moving the probe orientation indicator to a desired position within the coordinate system of the generated digital twin representation; and
positioning, via the one or more probe assembly controllers and the one or more probe controllers, the ultrasonic probe at a physical location in the ultrasonic testing environment corresponding to the desired position within the coordinate system of the generated digital twin representation.

* * * * *